(12) United States Patent
Godkin

(10) Patent No.: US 6,800,966 B2
(45) Date of Patent: Oct. 5, 2004

(54) LINEAR BRUSHLESS DC MOTOR WITH IRONLESS ARMATURE ASSEMBLY

(75) Inventor: Mikhail Godkin, San Diego, CA (US)

(73) Assignee: BEI Technologies, Inc., San Francisco, CA (US)

( * ) Notice: Subject to any disclaimer, the term of this patent is extended or adjusted under 35 U.S.C. 154(b) by 127 days.

(21) Appl. No.: 10/032,358

(22) Filed: Dec. 21, 2001

(65) Prior Publication Data

US 2002/0079997 A1 Jun. 27, 2002

Related U.S. Application Data

(60) Provisional application No. 60/258,205, filed on Dec. 26, 2000.

(51) Int. Cl.[7] .............................................. H02K 41/00
(52) U.S. Cl. .......................................... 310/12; 310/13
(58) Field of Search ............................. 310/12–15, 23, 310/24, 30, 34

(56) References Cited

U.S. PATENT DOCUMENTS

| | | | | |
|---|---|---|---|---|
| 3,149,255 A | * | 9/1964 | Trench | 310/30 |
| 4,363,980 A | * | 12/1982 | Petersen | 310/15 |
| 4,785,816 A | * | 11/1988 | Dow et al. | 600/446 |
| 5,345,206 A | | 9/1994 | Morcos | 335/222 |
| 5,434,549 A | * | 7/1995 | Hirabayashi et al. | 335/229 |
| 5,840,134 A | | 11/1998 | Furlani et al. | 148/302 |
| 5,896,076 A | | 4/1999 | van Namen | 335/229 |
| 6,157,100 A | * | 12/2000 | Mielke | 310/13 |
| 6,417,583 B1 | * | 7/2002 | Okada | 310/12 |

FOREIGN PATENT DOCUMENTS

| | | | |
|---|---|---|---|
| EP | 0580117 | 7/1993 | H02K/33/16 |
| EP | 0949748 | 11/1998 | H02K/41/03 |
| WO | 0139588 | 6/2001 | |

OTHER PUBLICATIONS

PCT International Search Report mailed Sep. 17, 2002, PCT/US01/50596.

* cited by examiner

*Primary Examiner*—Dang D. Le
(74) *Attorney, Agent, or Firm*—Gray Cary Ware & Freidenrich LLP

(57) ABSTRACT

A linear motion device is disclosed which includes an armature assembly, and a field assembly which includes a plurality of permanent magnets each having a length, and a plurality of pole pieces each having a length. The ratio between the length of the plurality of permanent magnets and the length of the plurality of pole pieces is tailored to achieve a constant force versus stroke characteristic, when sinusoidal commutation is used.

30 Claims, 8 Drawing Sheets

LINEAR BRUSHLESS DC MOTOR
(SECTION VIEW)

LINEAR BRUSHLESS DC MOTOR
FIG. 1A

FIG. 1B
(PRIOR ART)

LINEAR BRUSHLESS DC MOTOR
(SECTION VIEW)
FIG. 2

FIELD ASSEMBLY 12
FIG. 3

FIG. 4

Fig. 5
AIR GAP FLUX DENSITY DISTRIBUTION

FORCE VS. STROKE

Fig. 6

ARMATURE ASSEMBLY 13
FIG. 7B

ARMATURE ASSEMBLY 13
FIG. 7A

LINEAR BRUSHLESS DC MOTOR WITH IRONLESS ARMATURE ASSEMBLY

RELATED APPLICATIONS

The present application claims priority under 35 U.S.C. §119(e) from provisional application No. 60/258,205, filed Dec. 26, 2000.

TECHNICAL FIELD

The present invention relates generally to linear motion devices, and in particular to a linear brushless DC motor with an ironless armature assembly and substantially constant force throughout its stroke.

BACKGROUND ART

Figure 1A:
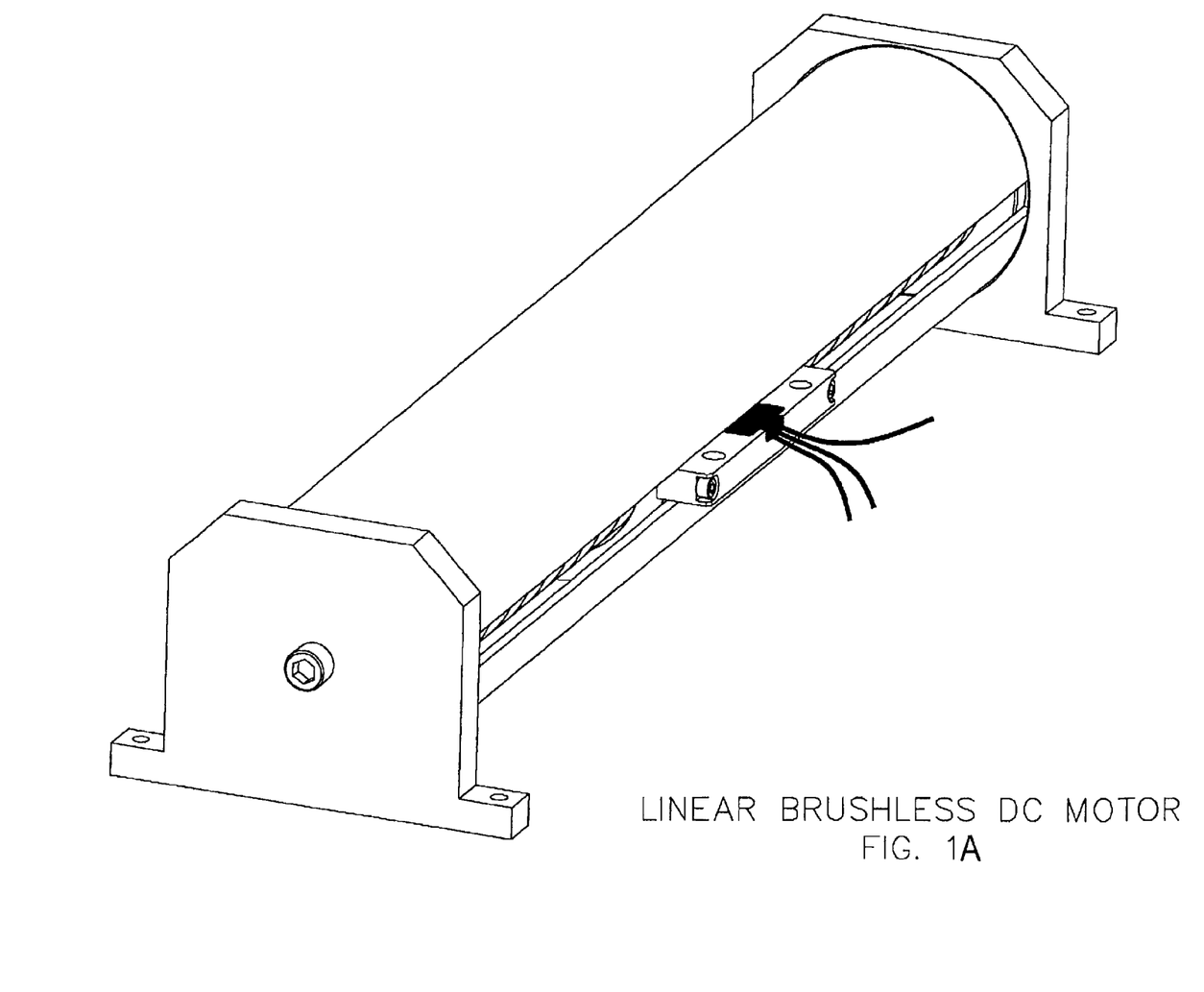
FIG. 1A is an illustration of a linear brushless DC motor.
Figure 1B:
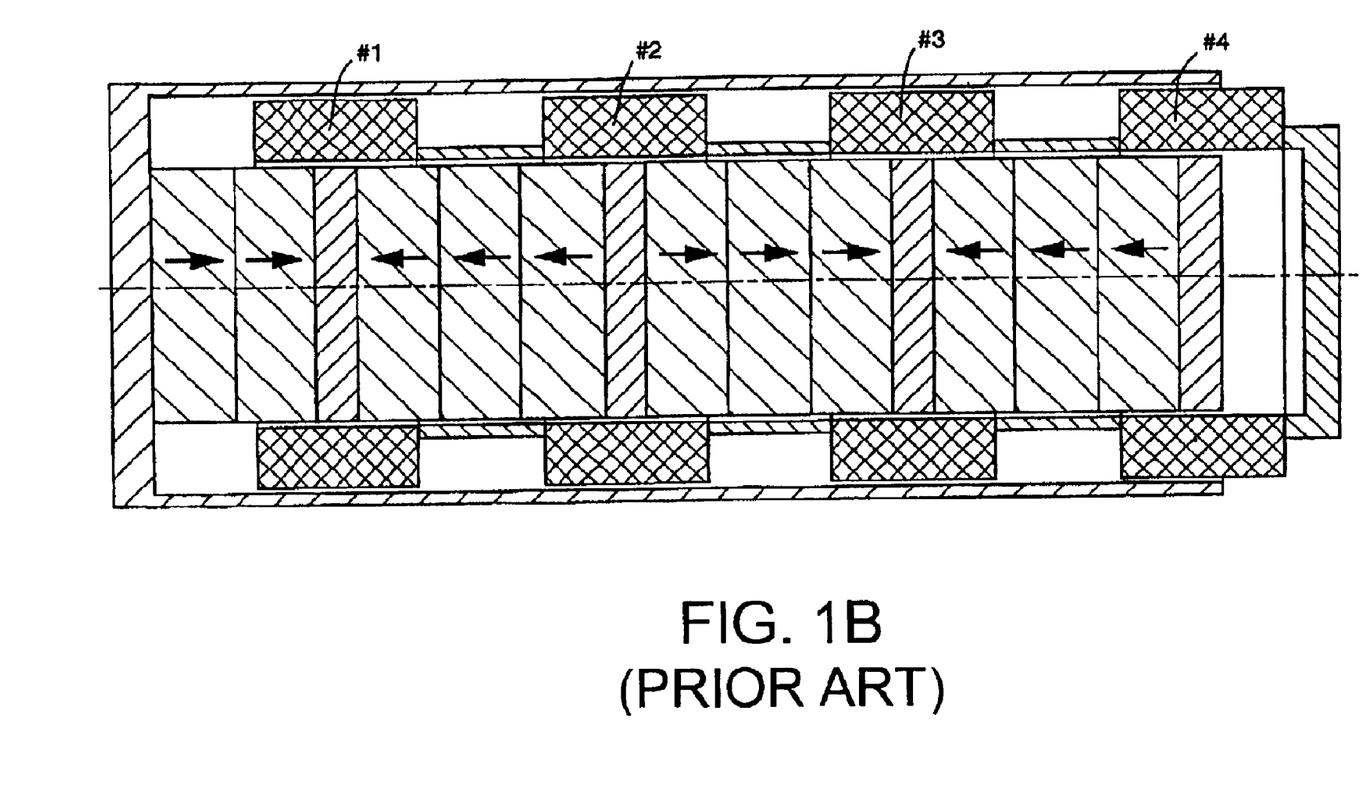
FIG. 1B is a cross section of the linear voice coil actuator disclosed in prior U.S. Pat. No. 5,345,206.

One of the simplest possible linear motion devices is a cylindrical linear voice coil actuator. However, these are limited stroke devices. If long strokes are required, a commutated linear voice coil actuator also known as a linear brushless DC motor can be used (FIG. 1A). An example of a linear brushless non-commutated device with flux-focused magnetic circuits can be found in the moving coil actuator disclosed in U.S. Pat. No. 5,345,206, assigned to BEI Electronics, Inc., the assignee of the subject application. U.S. Pat. No. 5,345,206 is hereby incorporated by reference into the subject application.

When linear motion devices are used in a servo system, the mass of a moving part (armature assembly) should be minimized. In addition, all the forces created by a motor, except for the force in the direction of motion, should be eliminated or minimized. And finally, to achieve a smooth operation, the force developed by a servomotor should remain constant throughout the stroke.

SUMMARY OF THE INVENTION

It is therefore an object of the present invention to provide a linear motion device that has a long stroke and moving parts of low mass.

It is another object of the present invention to provide a linear motion device in the form of a linear brushless DC motor in which the forces created by the motor, other than in the direction of motion, are minimized.

It is a further object of the present invention to provide a linear brushless DC motor having a smooth operation in which the force developed remains constant throughout the stroke.

It is a still further object of the present invention to provide a linear brushless DC motor having a smooth operation in which the force developed remains constant throughout the stroke by using a sinusoidal commutation of a three phase motor.

Figure 2:
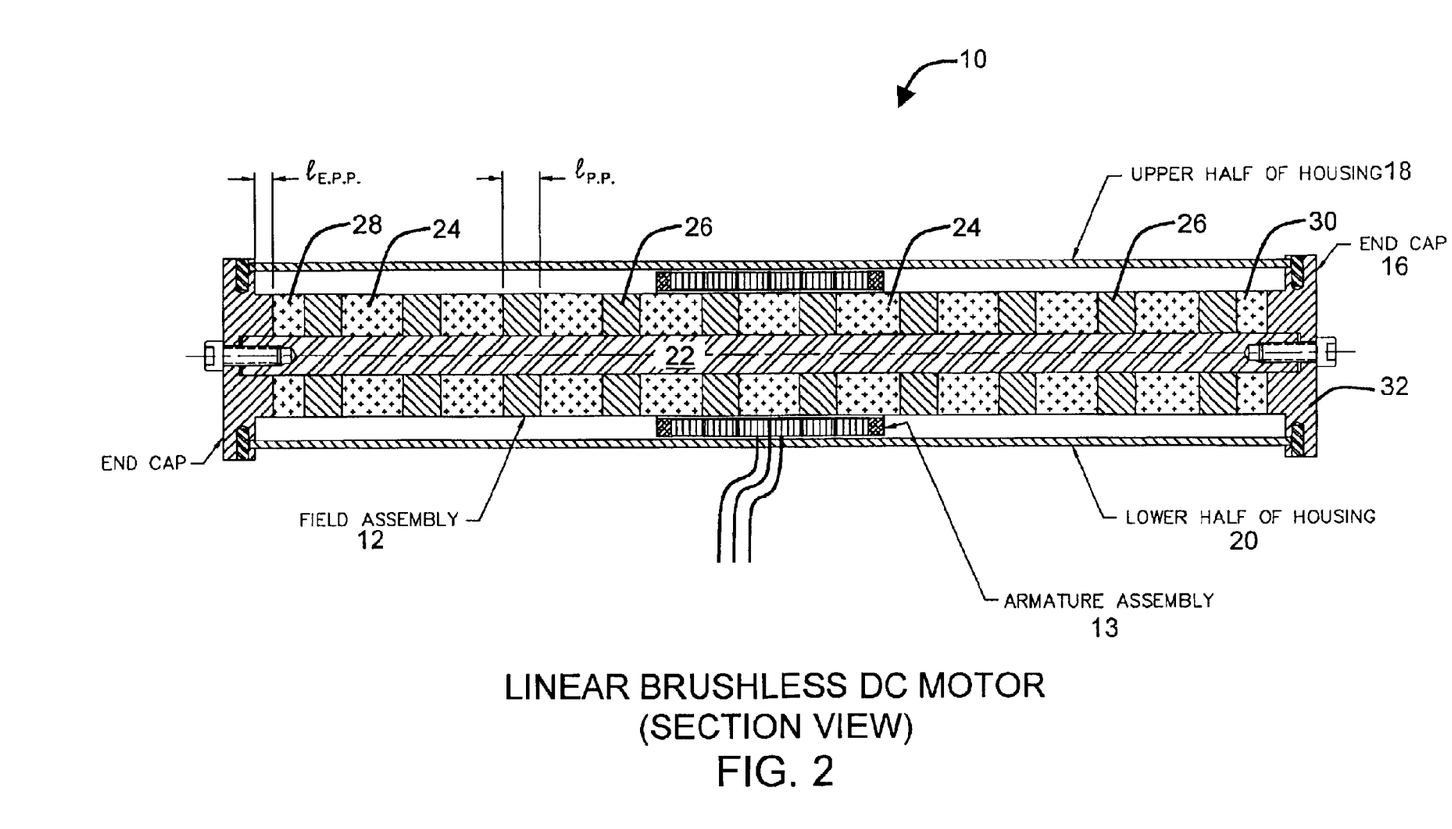
FIG. 2 is simplified cross section showing the housing, field assembly and armature assembly of an embodiment of the linear brushless DC motor of the present invention.

In accordance with the present invention there is provided a linear brushless DC motor with ironless armature assembly and a field assembly tailored to achieve a desired constant force versus stroke characteristic, for example, as set forth in FIG. 2.

The present invention comprises an armature assembly, and a field assembly that includes a plurality of permanent magnets each having a length, and a plurality of pole pieces each having a length. The ratio between the length of the plurality of permanent magnets and the length of the plurality of pole pieces is tailored to achieve a constant force versus stroke characteristic.

In accordance with the present invention, a brushless DC motor is provided comprising an armature assembly; and a field assembly positioned with respect to the armature assembly so that an air gap is formed between them. The field assembly includes a plurality of permanent magnets each having a length, and a plurality of pole pieces each having a length. The ratio between the length of the plurality of permanent magnets and the length of the plurality of pole pieces is selected to provide a sinusoidal distribution of a normal component of flux density in the air gap.

These and other objectives, features and advantages of the present invention will be more readily understood upon consideration of the following detailed description of the invention and the accompanying drawings.

DETAILED DESCRIPTION OF THE INVENTION

According to the present invention, the linear brushless DC motor 10 includes an armature assembly 13, a field assembly 12 "sandwiched" between two end caps 14, 16 made from soft magnetic material, and two halves 18, 20 of a housing also made from the soft magnetic material. The field assembly 12, as well as the end caps 14, 16 and the housing 18, 20 constitute a common magnetic circuit.

Figure 3:
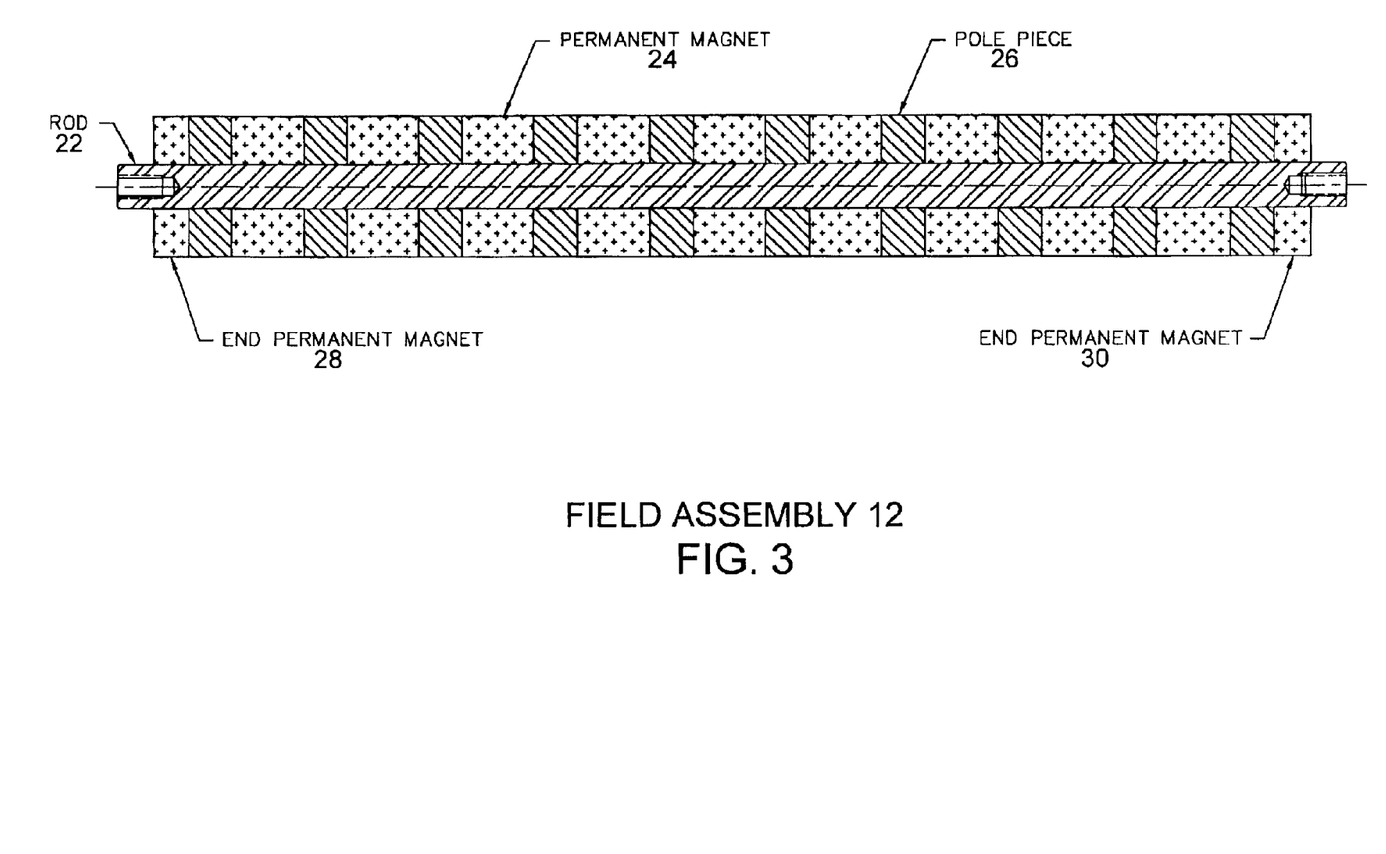
FIG. 3 is a simplified cross section of the field assembly of an embodiment of the linear brushless DC motor of the present invention.

The field assembly 12 comprises of a non-magnetic rod 22, which defines a common field assembly axis, and onto which axially magnetized cylindrical permanent magnets 24, soft magnetic pole pieces 26 and two axially magnetized end permanent magnets 28, 30 are installed, for example as set forth in FIG. 3.

Figure 4:
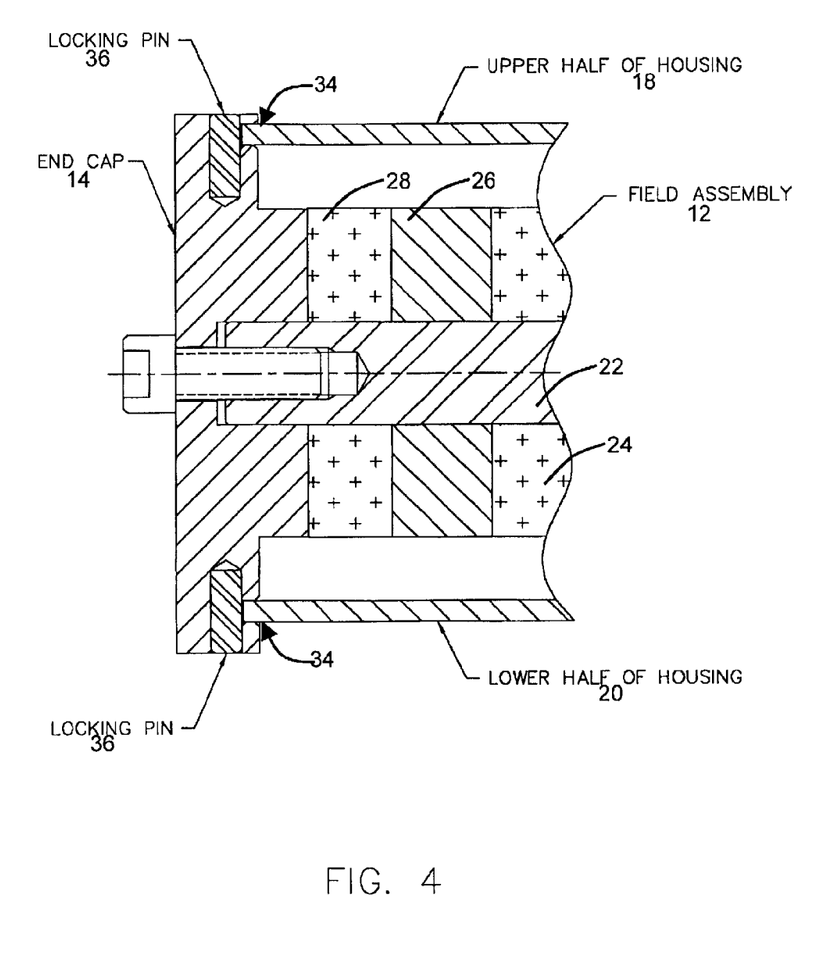
FIG. 4 is a simplified cross section showing details of an end cap of an embodiment of the linear brushless DC motor of the present invention.

The pole pieces 26 are located between the permanent magnets 24 that are magnetized in opposite directions. All the magnets 24 and pole pieces 26 are bonded together. For centering purposes, both ends of the field assembly rod 22 fit into the cylindrical bores 32 provided in the end caps 14, 16. The two halves 18, 20 of the housing fit into the circular cavities 34 also machined in the end caps 14, 16. To prevent the angular misalignment of the housing halves 18, 20, they are secured in place at both ends with the locking pins 36. See, FIG. 4.

Figure 5:
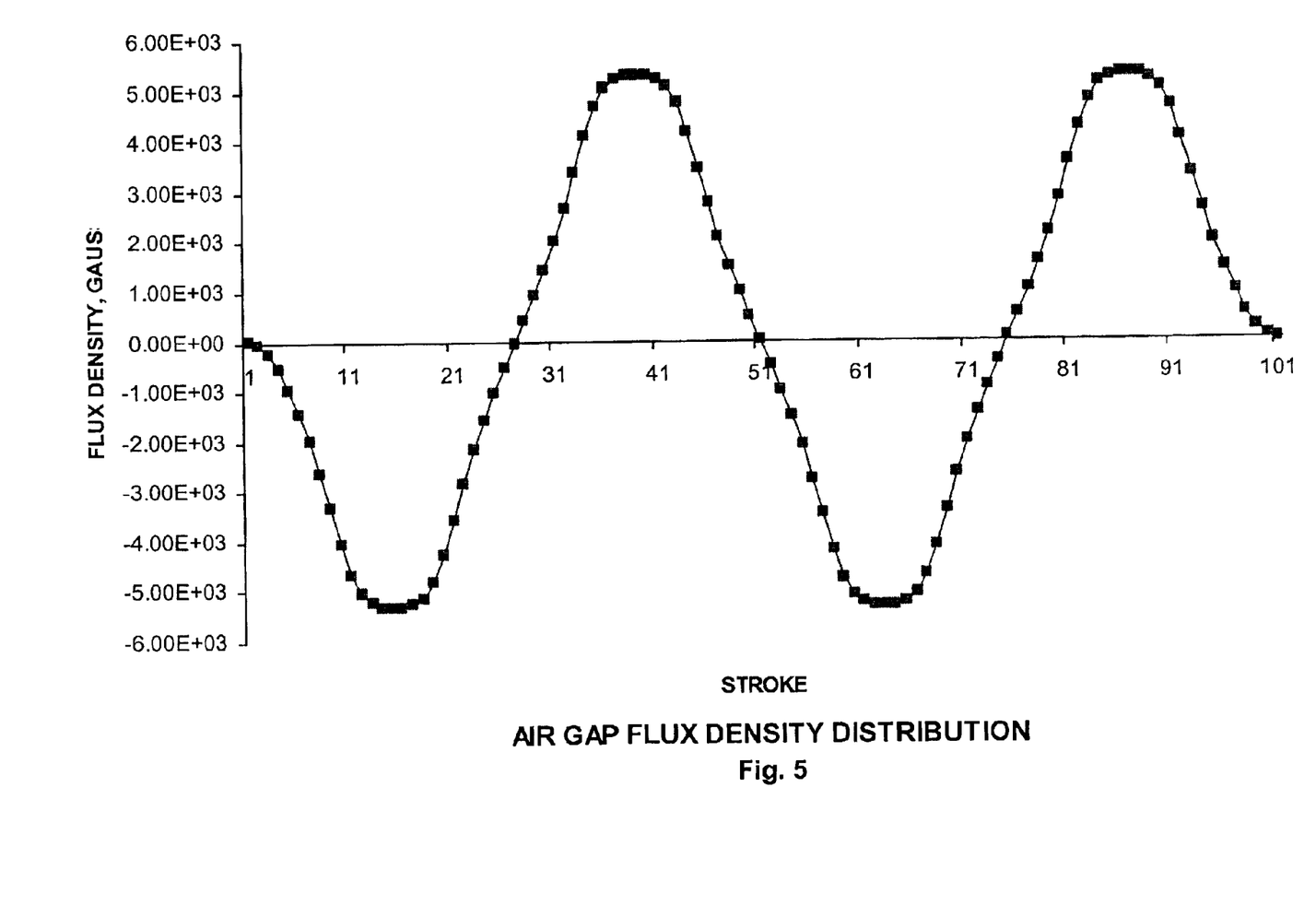
FIG. 5 illustrates a sinusoidal distribution of the normal component of the flux density in the air gap in accordance with one embodiment of the present invention.

Although the configuration of the magnetic components of the linear motor of the present invention is similar to that of a moving coil actuator disclosed in U.S. Pat. No. 5,345, 206 to Morcos, which is assigned to BEI Electronics, Inc., assignee of the subject application, there are two substantial differences:

1) The design of U.S. Pat. No. 5,345,206 was aimed to create flux-focused magnetic circuits whereas the present invention allows one to achieve a sinusoidal distribution of the normal component of the flux density in the air gap, as illustrated in FIG. 5. The sinusoidal distribution is obtained by selecting the appropriate ratio between the length of the permanent magnets and the length of the pole pieces. For example, referring to the pole pieces and the permanent magnets (other than the end permanent magnets) in FIG. 3, one such suitable ratio can be a pole piece length which is two-thirds (⅔) the length of the permanent magnet. The end magnet length was also selected accordingly.

Figure 6:
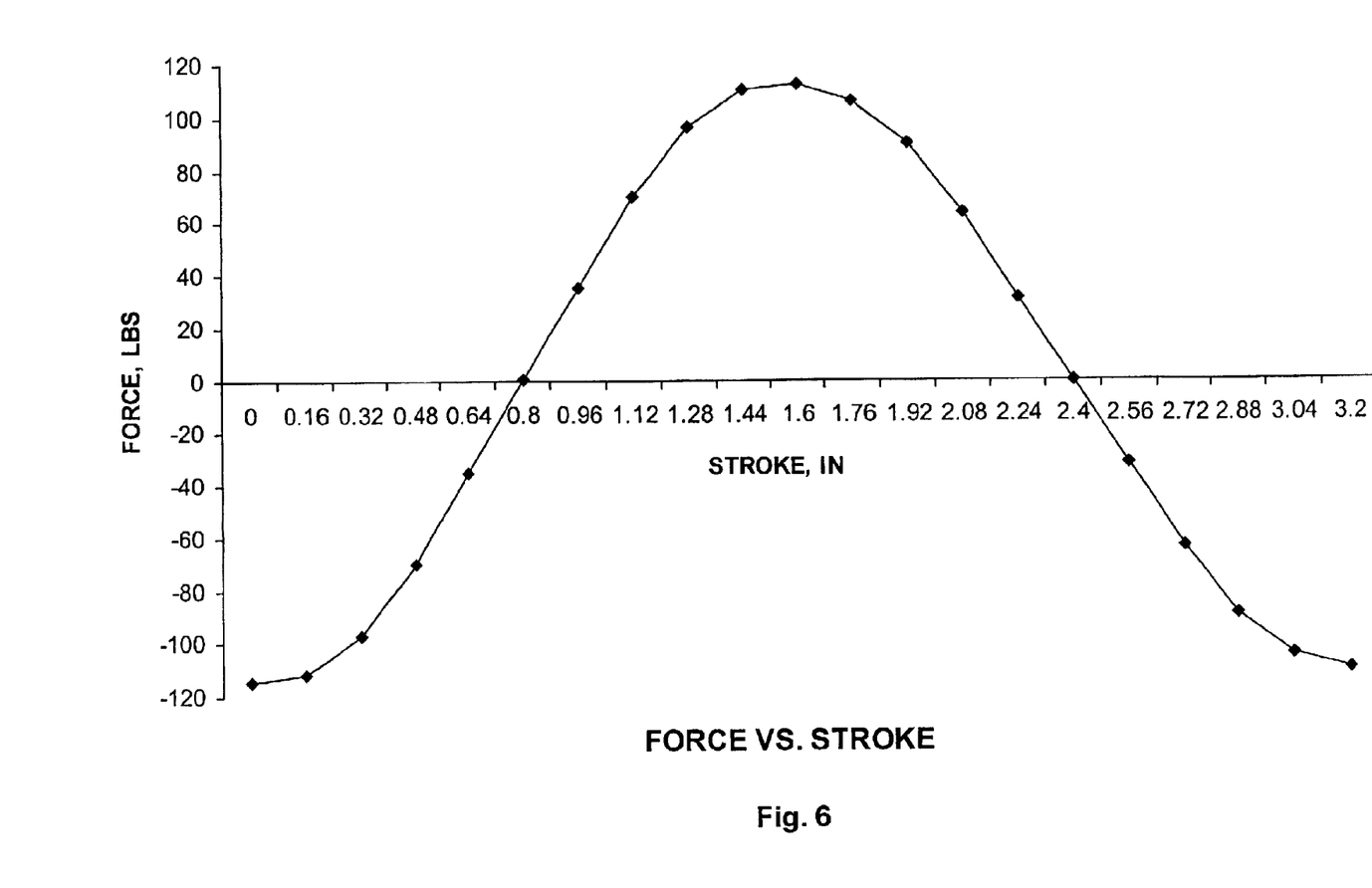
FIG. 6 illustrates a sinusoidal force versus entire stroke curve obtained for a one phase or combination of two phases of a three-phase motor in accordance with one embodiment of the present invention.

2) In order to get a sinusoidal force vs. entire stroke curve for one phase or a combination of the two phases of a three-phase motor, such as shown in FIG. 6, special attention was paid to selection of the proper ratio between the pole piece length ($l_{P.P.}$) and the length of the end pole piece ($l_{E\text{-}P\text{-}P}$) which is an integral part of the end cap. Referring to FIG. 2, an example is shown of one such suitable ratio which is an end pole piece length ($l_{E\text{-}P\text{-}P}$) which is one-half (½) the pole piece length ($l_{p\text{-}p\text{-}}$).

Figure 7A:
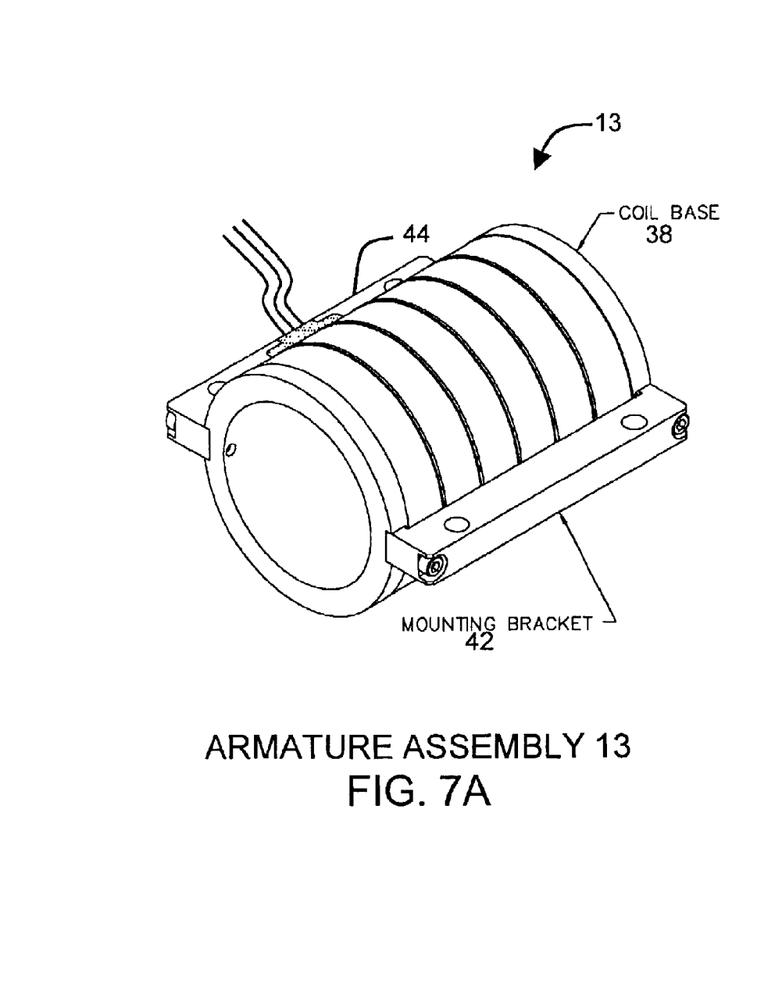
FIGS. 7A and 7B are a perspective view and a cross section, respectively, of the armature assembly of one embodiment of the present invention.
Figure 7B:
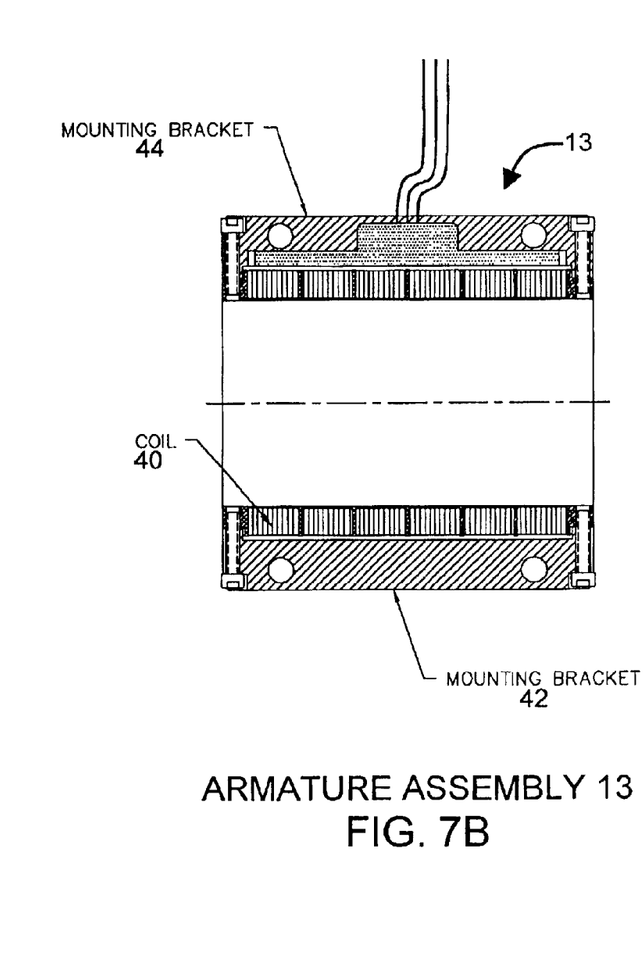

The armature assembly 13 includes a non-magnetic cylindrical coil base 38 with the cavities for the coils 40, the three-phase winding and the two mounting brackets 42, 44 to be connected to the load, as illustrated in FIG. 7.

The armature assembly 13 may slide on motor's own linear bearings (not shown) or may be supported by the linear bearings of the load.

The terms and expressions which have been employed herein are intended as terms of description and not of limitation, and there is no intent in the use of such terms and expressions of excluding equivalents of the features shown and described, or portions thereof, it being recognized that various modifications are possible within the scope of the invention claimed.

What is claimed is:

1. A brushless DC motor comprising
   an armature assembly; and
   a field assembly, including
      a plurality of permanent magnets each having a length;
      first and second end magnets each having a length; and
      a plurality of pole pieces each having a length; and
   wherein the length of the first and second end magnets is less than the length of the plurality of pole pieces and the length of the plurality of permanent magnets, and further wherein the ratios between the length of the plurality of permanent magnets, the length of the first and second end magnets, and the length of the plurality of pole pieces are tailored to achieve a constant force versus stroke characteristic with sinusoidal commutation.

2. A brushless DC motor comprising
   an armature assembly; and
   a field assembly positioned with respect to the armature assembly so that an air gap is formed between them, including
      a plurality of permanent magnets each having a length;
      first and second end magnets each having a length; and
      a plurality of pole pieces each having a length; and
   wherein the length of the first and second end magnets is less than the length of the plurality of pole nieces and the length of the plurality of permanent magnets, and further wherein the ratios between the length of the plurality of permanent magnets, the length of the first and second end magnets, and the length of the plurality of pole pieces is selected to provide a sinusoidal distribution of a normal component of flux density in the air gap.

3. The brushless DC motor of claims 1 or 2, further including
   a housing comprising magnetic material; and
   end caps including end pole pieces having a length, and positioned on the field assembly so that the field assembly, the end caps and the housing form a common magnetic circuit; and
   wherein the ratio of the length of the end pole pieces to the length of the plurality of pole pieces is selected so that a sinusoidal force versus entire stroke characteristic is obtained for the brushless DC motor.

4. The brushless DC motor of claim 3 wherein the length of each of the end pole pieces is one half (½) the length of each of the plurality of pole pieces.

5. The brushless DC motor of claims 1 or 2 wherein the plurality of permanent magnets and the plurality of pole pieces are positioned along a common field assembly axis, and so that each of the plurality of permanent magnets is separated from another by different ones of the plurality of pole pieces.

6. The brushless DC motor of claim 5, further including
   a housing comprising magnetic material; and
   end caps including end pole pieces having a length, and positioned on the field assembly so that the field assembly, the end caps and the housing form a common magnetic circuit, and wherein the length of each of the end pole pieces is one half (½) the length of each of the plurality of pole pieces.

7. The brushless DC motor of claims 1 or 2 wherein the armature assembly includes a non-magnetic coil base, and a plurality of coils supported on the non-magnetic coil base.

8. The brushless DC motor of claim 7 wherein the plurality of coils form a three (3) phase winding.

9. A brushless DC motor comprising
   an armature assembly;
   a field assembly, including
      a plurality of permanent magnets each having a length; and
      a plurality of pole pieces each having a length;
   a housing comprising magnetic material; and
   end cans including end pole pieces having a length, and positioned on the field assembly so that the field assembly, the end cans and the housing form a common magnetic circuit; and
   wherein the ratio between the length of the plurality of permanent magnets and the length of the plurality of pole pieces is tailored to achieve a constant force versus stroke characteristic, wherein the ratio of the length of the end pole pieces to the length of the plurality of pole pieces is selected so that a sinusoidal force versus entire stroke characteristic is obtained for the brushless DC motor, and wherein the length of each of the plurality of pole pieces is two-thirds (⅔) the length of each of the plurality of permanent magnets.

10. The brushless DC motor of claim 9 wherein the length of each of the end pole pieces is one half (½) the length of each of the plurality of pole pieces.

11. A brushless DC motor comprising
an armature assembly;
a field assembly, including
a plurality of permanent magnets each having a length; and
a plurality of pole pieces each having a length;
wherein the plurality of permanent magnets and the plurality of pole pieces are positioned along a common field assembly axis, and so that each of the plurality of permanent magnets is separated from another by different ones of the plurality of pole pieces, and
wherein the ratio between the length of the plurality of permanent magnets and the length of the plurality of pole pieces is tailored to achieve a constant force versus stroke characteristic, and further wherein the length of each of the plurality of pole pieces is two-thirds (⅔) the length of each of the plurality of permanent magnets.

12. The brushless DC motor of claim 11, further including
a housing comprising magnetic material; and
end caps including end pole pieces having a length, and positioned on the field assembly so that the field assembly, the end cans and the housing form a common magnetic circuit, and wherein the length of each of the end pole pieces is one half (½) the length of each of the plurality of pole pieces.

13. A linear motion device, comprising
a field assembly, including
a plurality of pole pieces;
a plurality of end pole pieces;
a plurality of permanent magnets;
first and second end magnets; and
wherein the plurality of pole pieces, the plurality of end pole pieces, and the plurality of permanent magnets are positioned along a common axis so that ones of the plurality of pole pieces are positioned between ones of the plurality of permanent magnets;
a housing positioned about the field assembly to form a common magnetic circuit with the field assembly;
an armature assembly adapted to travel along the common axis, and positioned between the housing and the field assembly to define a gap between the armature assembly and the field assembly, the armature assembly including
a non-magnetic coil base;
a plurality of coils supported on the non-magnetic coil base; and
further wherein each of the plurality of permanent magnets has a length and polarity and each of the plurality of pole pieces has a length and the plurality of end pole pieces has a length, and the first and second end magnets each has a length which is less than the length of the plurality of magnets and the length of the plurality of pole pieces, all of which are selected so that the field assembly provides a constant force versus stoke characteristic and a sinusoidal distribution of a normal component of the flux density in the gap.

14. The linear motion device of claim 13 wherein the length of each of the end pole pieces is one half (½) the length of each of the plurality of pole pieces.

15. A linear motion device, comprising
a field assembly, including
a plurality of pole pieces;
a plurality of end pole pieces; and
a plurality of permanent magnets;
wherein the plurality of pole pieces, the plurality of end pole pieces, and the plurality of permanent magnets are positioned along a common axis so that ones of the plurality of pole pieces are positioned between ones of the plurality of permanent magnets;
a housing positioned about the field assembly to form a common magnetic circuit with the field assembly;
an armature assembly adapted to travel along the common axis, and positioned between the housing and the field assembly to define a gap between the armature assembly and the field assembly, the armature assembly including
a non-magnetic coil base;
a plurality of coils supported on the non-magnetic coil base; and
further wherein each of the plurality of permanent magnets has a length and polarity and each of the plurality of pole pieces and plurality of end pole pieces has a length which are selected so that the field assembly provides a constant force versus stoke characteristic and a sinusoidal distribution of a normal component of the flux density in the gap, wherein the length of each of the plurality of pole pieces is two-thirds (⅔) the length of each of the plurality of permanent magnets.

16. A method of forming a brushless DC motor having an armature assembly and a field assembly, comprising the steps of
positioning a plurality of permanent magnets each having a length and first and second end magnets each having a length, along a common field assembly axis;
positioning a plurality of pole pieces each having a length along the common field assembly axis, and so that ones of the plurality of pole pieces alternate with ones of the plurality of permanent magnets; and
selecting ratios between the length of the plurality of permanent magnets, the lengths of the first and second end magnets, and the length of the plurality of pole pieces to achieve a sinusoidal force versus stroke characteristic, when only one phase or a combination of two phases of the armature are energized, wherein the lengths of the first and second end magnets are less than the length of the plurality of permanent magnets, and less then the length of the plurality of pole pieces.

17. The method of claim 16, further including the step of positioning the field assembly with respect to the armature assembly so that an air gap is formed between them, and further wherein the selecting step includes
setting the ratio between the length of the plurality of permanent magnets and the length of the plurality of pole pieces to provide a sinusoidal distribution of a normal component of flux density in the air gap.

18. The method of claims 16 or 17, further including the steps of
providing a housing formed of magnetic material;
providing end caps including end pole pieces having a length, and
positioning the housing and the end caps and the field assembly so that the field assembly, the end caps and the housing form a common magnetic circuit; and
adjusting the ratio of the length of the end pole pieces to the length of the plurality of pole pieces so that a sinusoidal force versus entire stroke characteristic is obtained for the brushless DC motor.

19. The method of claim 18 wherein the adjusting step includes the step of setting the length of each of the plurality of pole pieces to be two-thirds (⅔) the length of each of the plurality of permanent magnets.

20. The method of claim 18 wherein the adjusting step includes the step of setting the length of each of the end pole pieces to be one half (½) the length of each of the plurality of pole pieces.

21. The method of claims 16 or 17 wherein the selecting step includes the step of setting the length of each of the plurality of pole pieces to be two-thirds (⅔) the length of each of the plurality of permanent magnets.

22. The method of claims 16 or 17 further including the step of forming the armature assembly of a non-magnetic coil base, and a plurality of coils supported on the non-magnetic coil base.

23. The method of claim 22 wherein the step of forming the armature assembly step includes the step of forming a three (3) phase winding from the plurality of coils.

24. A method of forming a linear motion device, comprising the steps of forming a field assembly of a plurality of pole pieces, a plurality of end pole pieces, and a plurality of permanent magnets, and first and second end magnets;

positioning the plurality of pole pieces, the plurality of end pole pieces the first and second end magnets, and the plurality of permanent magnets along a common axis so that ones of the plurality of pole pieces are positioned between ones of the plurality of permanent magnets, and the first end magnet followed by one of the plurality of end pole pieces is positioned at one end, and the second end magnet followed by another of the plurality of end pole pieces is positioned at an opposite end;

positioning a housing about the field assembly to form a common magnetic circuit with the field assembly;

supporting a plurality of coils supported on a non-magnetic coil base to form an armature assembly;

positioning the armature assembly to be adapted to travel along the common axis between the housing and the field assembly and to define a gap between the armature assembly and the field assembly, and selecting a length and polarity of each of the plurality of permanent magnets, a length and polarity of the first and second end magnets, a length and polarity of each of the plurality of pole pieces, and length and polarity of each of the plurality of end pole pieces, wherein the length of the first and second end magnets is less than the length of the plurality of permanent magnets and the length of the plurality of pole pieces, so that the field assembly provides a constant force versus stoke characteristic and a sinusoidal distribution of a normal component of the flux density in the gap.

25. The method of claim 24, wherein the selecting step includes the step of setting the length of each of the plurality of pole pieces to be two-thirds (⅔) the length of each of the plurality of permanent magnets.

26. The method of claim 24, wherein the selecting step includes the step of setting the length of each of the end pole pieces to be one half (½) the length of each of the plurality of pole pieces.

27. A brushless DC motor comprising an armature assembly; and a field assembly positioned with respect to the armature assembly so that an air gap is formed between them, including
a plurality of permanent magnets each having a length; and
a plurality of pole pieces each having a length;

a housing comprising magnetic material; and end caps including end pole pieces having a length, and positioned on the field assembly so that the field assembly, the end caps, and the housing form a common magnetic circuit; and wherein the ratio between the length of the plurality of permanent magnets and the length of the plurality of pole pieces is selected to provide a sinusoidal distribution of a normal component of flux density in the air gap, and wherein the length of each of the plurality of pole pieces is two-thirds (⅔) the length of each of the plurality of permanent magnets.

28. The brushless DC motor of claim 27, wherein the length of each of the end pole pieces is one half (½) the length of each of the plurality of pole pieces.

29. A brushless DC motor comprising an armature assembly; and a field assembly positioned with respect to the armature assembly so that an air gap is formed between them, including a plurality of permanent magnets each having a length; and a plurality of pole pieces each having a length; wherein the plurality of permanent magnets and the plurality of pole pieces are positioned along a common field assembly axis, and so that each of the plurality of permanent magnets is separated from another by different ones of the plurality of pole pieces; and wherein the ratio between the length of the plurality of permanent magnets and the length of the plurality of pole pieces is selected to provide a sinusoidal distribution of a normal component of flux density in the air gap; and wherein the length of each of the plurality of pole pieces is two-thirds (⅔) the length of each of the plurality of permanent magnets.

30. The brushless DC motor of claim 29, further including a housing comprising magnetic material; and end caps including end pole pieces having a length, and positioned on the field assembly so that the field assembly, the end caps and the housing form a common magnetic circuit, and wherein the length of each of the end pole pieces is one half (½) the length of each of the plurality of pole pieces.

* * * * *